Jan. 25, 1938. B. A. PROCTOR ET AL 2,106,623
PROCESS FOR MAKING PHONOGRAPHIC RECORDS
Filed March 22, 1934 3 Sheets-Sheet 1
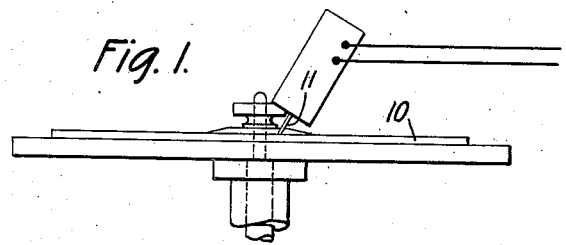
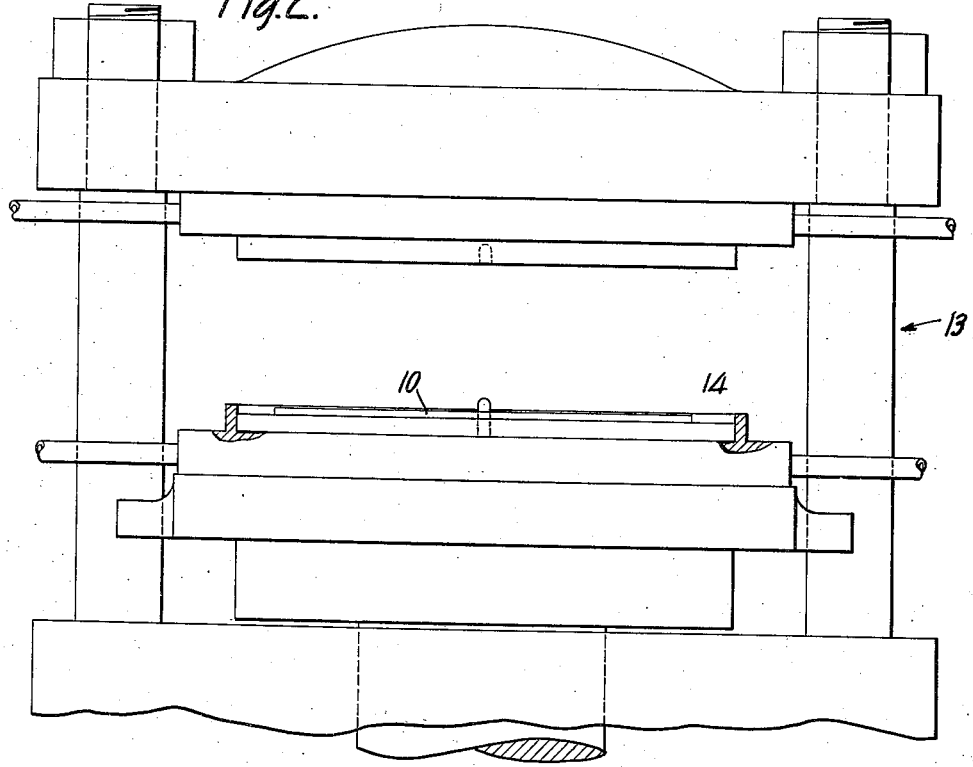
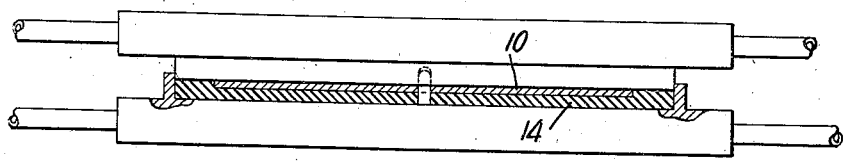
INVENTORS
Barton A. Proctor and
Ferdinand C. W. Thiede
BY Moses & Nolte
ATTORNEYS.

INVENTORS
Barton A. Proctor and
Ferdinand C. W. Thiede
BY Moses & Nolte
ATTORNEYS.

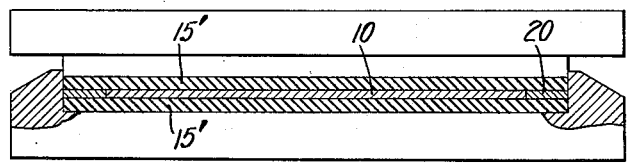
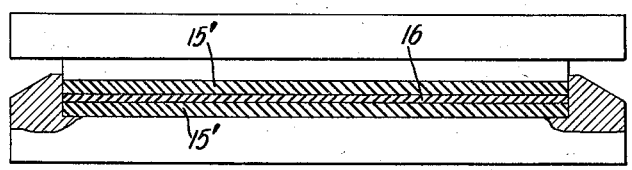
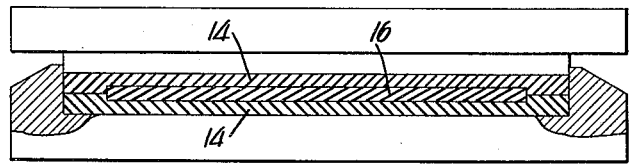
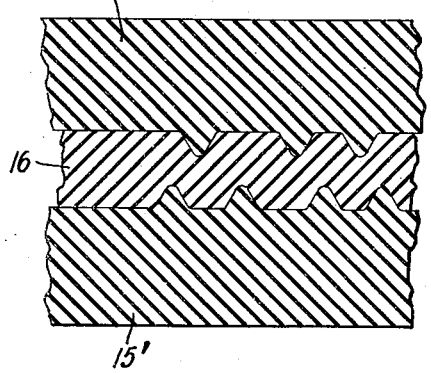
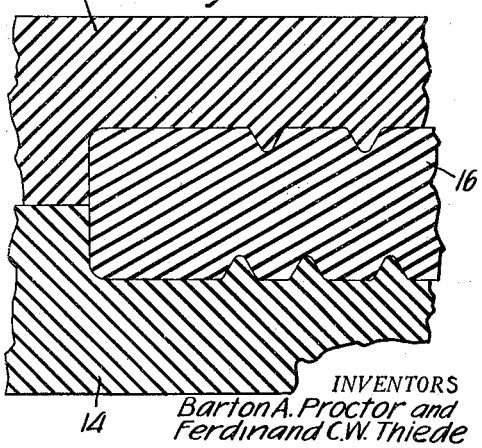

Patented Jan. 25, 1938

2,106,623

UNITED STATES PATENT OFFICE 2,106,623

PROCESS FOR MAKING PHONOGRAPHIC RECORDS

Barton A. Proctor, Larchmont, and Ferdinand C. W. Thiede, Hempstead, N. Y., assignors to B. A. Proctor Company, Inc., New York, N. Y., a corporation of New York Application March 22, 1934, Serial No. 716,916

5 Claims. (Cl. 18—48.3)

This invention relates to apparatus and processes for making phonographic records.

In the present day practice of making phonographic records the original engraving is done on a wax record blank. A thin film of graphite is applied to the wax record formed and a layer of metal is deposited by electroplating on the graphite film, to form a metal negative for stamping out record blanks.

This process is costly. The wax records are expensive, very delicate and subject to temperature changes. They require careful preparation, including a shaving operation which takes time and special skill. The surface of the record is easily marred so that very careful handling of the record is necessary. After recordation, the working of the graphite into the wax preparatory to electroplating, causes injury of the record and impairs, therefore, the fidelity of the final record. The electroplating operation takes a long time, in some cases as much as 18 to 20 hours. Only one plated record can ordinarily be made from the original wax record. The surface of the plated negative record is granular and relatively coarse, thus causing further injury to the fidelity of the recording.

In this process, moreover, there can be no "playing back" of the record until the entire process has been completed. Hence, if there has been a fault in the original recording it is not apparent until the whole cycle of operation has been completed.

It is an object of the present invention to provide a process which will be both cheaper and quicker than the process now commonly employed, and which will permit the record to be "played back" immediately after recording, so that any fault in the original recording may be detected at once, and a new record made immediately, if necessary.

According to the present invention the original record is made not in soft wax, as in the prior art, but in a material, such as metal, which is capable of withstanding heat of at least several hundred degrees Fahrenheit and pressure of approximately one or two thousand pounds per square inch. The material which is now preferred is sheet aluminum of a thickness of approximately $\frac{1}{16}$ inch. It will be understood, however, that other metals such as copper, tin, zinc and various alloys may also be employed. These metals, and particularly aluminum, have the advantage over the wax records of the prior art, of being inexpensive, unbreakable, impervious to moisture, and insensitive to temperature. They may be purchased in sheet form with a polished surface in condition for use. They do not require the high degree of skill that is necessary for the successful recordation on wax.

After the original recordation on the aluminum disc the same is immediately "played back" by using a reproducer with a non-scratchy needle, such as fibre. If the record is found suitable for duplication the second step in the process is performed.

This step consists in placing the engraved record, after cleaning, into a hydraulic press together with a thermosetting material and applying sufficient heat and pressure first to soften and take the imprint of the aluminum disc and then to harden with the imprint clearly impressed therein.

The thermosetting material preferably employed is phenol formaldehyde, as for example, the material sold on the market under the trademark "Bakelite." This material is preferably employed in sheets of $\frac{1}{8}$ inch thickness. It required a temperature of approximately 300° Fahrenheit and a pressure of about 1900 pounds per square inch. It may be cured or set with the imprint in approximately ten minutes time. It will be understood that other types of thermosetting materials may be employed, such as ureaformaldehyde or glycerine-phthalic anhydride resins. The term thermosetting material, as herein employed, is used as defining a material which will not only melt or flow to take the shape of the mold under the influence of heat and pressure while in contact with the mold, but during the interval at which it is subjected to heat and pressure will set to an infusible, insoluble, chemically inert product which may be taken from the hot mold without danger of warping or breaking.

The final record is formed by the third step of the process. To perform this step the negative record of thermosetting material is removed from the press and separated from the original or master record. The material from which the final record is made is preferably a thermoplastic substance having a property of softening under heat and pressure, taking the imprint of a mold while in this condition and upon cooling becoming hard with the imprint retained therein. There are many substances of this kind known to the art, such for example, as cellulose ester and ether plastics, particularly cellulose acetate. A sheet of the thermoplastic substance is placed into contact with the negative record of thermosetting material and the two are then subjected by means of a press to a proper temperature and pressure. In the case of cellulose acetate this temperature is approximately 300° Fahrenheit and the pressure is approximately 1200 pounds per square inch. We prefer to use cellulose acetate for the material of the final record, partly because the record so formed does not crumble under the impact of the playing needle and the surface noise is thereby greatly reduced. After the final record of thermoplastic substance has been cooled it is removed from the press. It is then in condition for use.

In order that our invention may be best understood we have illustrated means for carrying out our improved method as above described, in the accompanying drawings in which Fig. 1 shows diagrammatically the operation of engraving the sound track upon a metal disc;

Fig. 2 shows a hydraulic press for making a negative record using the engraved metal disc as a matrix;

Fig. 3 also illustrates the operation represented by Fig. 2 but shows dies in molding position;

Fig. 9 shows the step of simultaneously molding the negative impressions of sound tracks on either side of the original record;

Fig. 10 shows the molding of the final record from the two negative records made in the preceding step;

Fig. 11 shows the operation of molding a double final record from the two negative records or matrices formed as shown in Figs. 2 and 3;

Figs. 12 and 13 show enlarged cross-sections of the final record within the matrices corresponding to Figs. 10 and 11 respectively.

Referring to the above drawings and especially to Figs. 1 and 2 the metal blank 10 is first engraved by the electrically operated stylus 11. The sound track so produced is now used as a matrix in the hydraulic press denoted generally by 13 for the making of an intermediate or negative record. To accomplish this a layer of the raw condensation or thermosetting product is filled in the lower die of the press as shown at 14 and the engraved disc 10 is placed face down upon such layer. The die is now heated to the appropriate temperature for the material used as previously mentioned, and the upper and lower dies brought together under the proper pressure, as indicated in Fig. 3.

Figure 4:
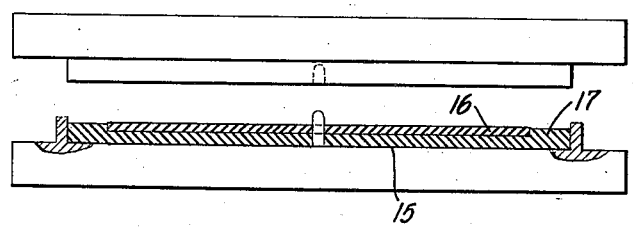
Fig. 4 shows the operation of molding the final record from the intermediate or negative record made in the foregoing steps.
Figure 5:
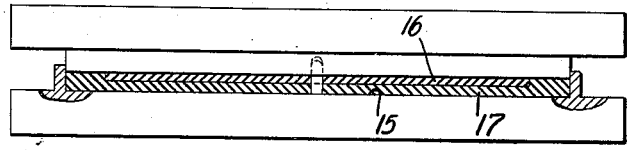
Fig. 5 shows further progress of the step illustrated in Fig. 4.
Figure 6:
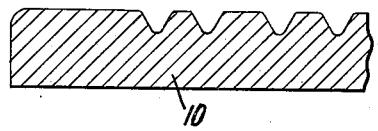
Fig. 6 shows a portion of the metal disc in magnified cross-section showing the engraved sound track.
Figure 7:
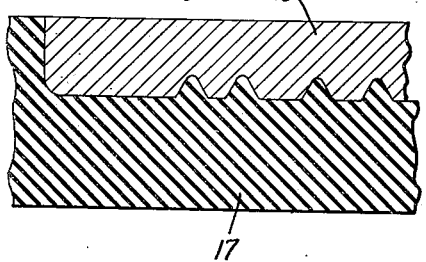
Fig. 7 is an enlarged cross-section of the original and negative records as seen in Fig. 3.
Figure 8:
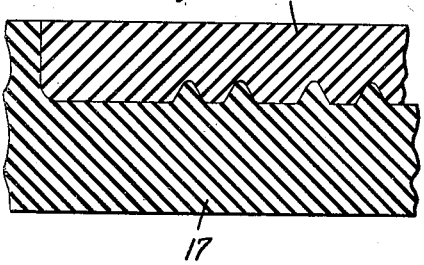
Fig. 8 is a similar enlarged cross-section of the final records and matrix.

The result of the foregoing operations is to produce a negative impression or record of the original record 10. When this record, denoted 15, has been fully cured it is used as the matrix in the making of the final records. This operation is illustrated in Figs. 4 and 5. It will be noted that because of the larger size of the negative record in respect to the metal original, an upraised rim 17 is formed which serves to hold the thermoplastic material of the final record. When this material has been suitably filled in the matrix 15, the upper and lower dies are brought together under the pressure and at the temperature above specified, such operation being illustrated in Fig. 5.

When it is desired to make a double record the metal disc 10 is first engraved by the stylus on both sides whereupon the layer of the raw condensation product is placed above and below said record in the place indicated in Fig. 9. If desired, in order to enable the negative records to have a diameter greater than the metal disc, a ring 20 may be employed to surround said metal disc. Two negative records are then made similarly to the making of the single negative. They are then used to mold the final records as shown in Fig. 10.

Instead of specially preparing the negative records or molds in accordance with the steps shown in Figs. 9 and 10 two of the matrix or negative records 15 having the enlarged rim 17 may be used simultaneously to produce a doublefaced record 16 as shown in Fig. 11. The final records so produced, however, are apt to be somewhat thicker than those made by the operations described in the foregoing.

It will be understood that instead of using a record of thermoplastic substance a record consisting of paper, "Bakelite", or other material coated with a surface of cellulose acetate may also be employed.

We have described what we believe to be the best embodiment of our invention. We do not wish, however, to be confined to the embodiments shown, but what we desire to cover by Letters Patent is set forth in the appended claims.

We claim:

1. The method of making phonographic records which consists in inscribing a sound track upon a planiform blank having a hard, smooth, tough, impression-retaining surface and capable of withstanding heat and pressure of the order employed in the molding of thermosetting materials, using said inscribed blank as a matrix and molding directly against the inscribed surface thereof, an intermediate negative record of thermosetting material thereby producing thereon a negative impression of said sound track and then after the cure of the thermosetting record is complete, using said thermosetting record as a matrix for obtaining a final record of a suitable impression-retaining material.

2. The method according to claim 1 in which the blank consists of sheet aluminum.

3. The method according to claim 1 in which the final record consists of a cellulose acetate plastic.

4. The method according to claim 1 in which the thermosetting material is a phenol formaldehyde condensation product.

5. The method herein described which consists in inscribing the original sound track upon a planiform metal blank having a hard, smooth, tough, impression-retaining surface and capable of withstanding heat and pressure of the order employed in the molding of thermosetting materials, and forming an intermediate negative record therefrom by molding thermosetting material directly against the inscribed surface of said metal blank.

BARTON A. PROCTOR.
FERDINAND C. W. THIEDE.